United States Patent
Ma et al.

(10) Patent No.: US 8,386,560 B2
(45) Date of Patent: Feb. 26, 2013

(54) PIPELINE FOR NETWORK BASED SERVER-SIDE 3D IMAGE RENDERING

(75) Inventors: Ke Ma, Beijing (CN); Lijiang Fang, Beijing (CN); Chao Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 478 days.

(21) Appl. No.: 12/206,151

(22) Filed: Sep. 8, 2008

(65) Prior Publication Data

US 2010/0063992 A1 Mar. 11, 2010

(51) Int. Cl.
*G06F 15/16* (2006.01)

(52) U.S. Cl. ......................................... 709/203; 709/232

(58) Field of Classification Search .................. 709/203, 709/232, 217
See application file for complete search history.

(56) References Cited

U.S. PATENT DOCUMENTS

| | | | |
|---|---|---|---|
| 5,546,530 A | 8/1996 | Grimaud et al. | |
| 6,031,541 A * | 2/2000 | Lipscomb et al. | 345/420 |
| 6,115,356 A * | 9/2000 | Kalkunte et al. | 370/229 |
| 6,396,507 B1 * | 5/2002 | Kaizuka et al. | 345/661 |
| 6,442,139 B1 * | 8/2002 | Hosein | 370/236 |
| 6,522,336 B1 * | 2/2003 | Yuasa | 345/582 |
| 6,924,799 B2 | 8/2005 | Lefebvre et al. | |
| 7,139,794 B2 | 11/2006 | Levanon et al. | |
| 7,269,302 B2 | 9/2007 | Gershony et al. | |
| 7,274,368 B1 | 9/2007 | Keslin | |
| 7,342,588 B2 | 3/2008 | Lefebvre et al. | |
| 2003/0055896 A1 * | 3/2003 | Hu et al. | 709/205 |
| 2003/0120896 A1 * | 6/2003 | Gosior et al. | 712/32 |
| 2003/0212742 A1 | 11/2003 | Hochmuth et al. | |
| 2004/0034723 A1 * | 2/2004 | Giroti | 710/8 |
| 2005/0111361 A1 * | 5/2005 | Hosein | 370/230 |
| 2005/0157756 A1 * | 7/2005 | Ormond | 370/474 |
| 2005/0285875 A1 * | 12/2005 | Kang et al. | 345/629 |
| 2006/0101154 A1 | 5/2006 | Becker et al. | |
| 2007/0046966 A1 * | 3/2007 | Mussack et al. | 358/1.13 |
| 2007/0115282 A1 * | 5/2007 | Turner et al. | 345/424 |

(Continued)

FOREIGN PATENT DOCUMENTS

WO WO2008040123 A1 4/2008

OTHER PUBLICATIONS

Banerjee. Remote Execution for Mobile 3D Graphics, MS Thesis, May 2005. http://www.wpi.edu/Pubs/ETD/Available/etd-052305-160204/unrestricted/banerjeek.pdf. Last accessed Jul. 1, 2008, 104 pages.

(Continued)

*Primary Examiner* — Patrice Winder
*Assistant Examiner* — Ebrahim Golabbakhsh

(57) ABSTRACT

The claimed subject matter provides a system and/or a method that facilitates rendering a portion of an image from a server on a client. A portion of an image can be hosted by a server. A client can utilize a device to interact with the portion of an image via a network. The client can established two or more TCP/IP connections with the server in order to interact with the portion of the image. A pipe component can enforce an isolated pipeline and a processing thread for each of a user manipulation of the portion of the image, a transmission of a user request to manipulate the portion of the image via the network, a rendering of the portion of the image on the server, a compression of the portion of the image on the server, a transmission of the compressed portion of the image via the network, a decompression of the portion of the image on the client, and a display of the portion of the image on the client.

20 Claims, 10 Drawing Sheets

U.S. PATENT DOCUMENTS

2008/0101406 A1* 5/2008 Matoba .................. 370/468
2009/0225076 A1* 9/2009 Vlietinck ................ 345/419
2009/0237697 A1* 9/2009 Caruso et al. ........... 358/1.13
2009/0251478 A1* 10/2009 Maillot et al. ........... 345/581
2009/0256836 A1* 10/2009 Fowler et al. ........... 345/419

OTHER PUBLICATIONS

Cagle. Working with Asynchronous Server Content, Mar. 19, 2007. http://ajax.sys-con.com/read/347076.htm. Last accessed Jul. 1, 2008, 3 pages.

* cited by examiner

PIPELINE FOR NETWORK BASED SERVER-SIDE 3D IMAGE RENDERING

BACKGROUND

Advances in computer technologies (e.g., microprocessor speed, memory capacity, data transfer bandwidth, software functionality, and the like) have generally contributed to increased computer applications in various industries. Ever more powerful server systems, which are often configured as a cluster of servers, are commonly provided to service requests originating from external sources such as the World Wide Web, for example.

In light of such advances, the amount of available electronic data grows and it becomes more important to store such data in a manageable manner that facilitates user friendly and quick data searches and retrieval. Today, a common approach is to store electronic data in one or more databases or data stores. In general, a typical data store can be referred to as an organized collection of information with data structured such that a computer program can quickly search and select desired pieces of data, for example. Commonly, data within a data store is organized via one or more tables. Such tables are arranged as an array of data rows.

Such electronic data can be hosted by a server and accessed by a client. In particular, there are techniques to render image data on the server side and transmit such data to the client for display. Yet, the network bandwidth and latency can significantly reduce the rendering speed (e.g., frames per second (FPS), etc.) and increase the response time for data manipulation (e.g., lag, etc.). Such lag and latency in response time to data requests and/or manipulations can deteriorate the experience of interacting with such data (e.g., image data, 3-dimensional image data, etc.). In addition, the network can become congested by requests in which the performance can be further hindered.

SUMMARY

The following presents a simplified summary of the innovation in order to provide a basic understanding of some aspects described herein. This summary is not an extensive overview of the claimed subject matter. It is intended to neither identify the key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate pipelining stages associated with a client accessing a portion of an image hosted by a server. A pipe component can employ a pipelined system for image rendering, transmission, and display in order to hide network latency and improve overall rendering performance. The subject innovation can provide an adaptive mechanism for client request combination and/or cancellation. Moreover, the claimed subject matter can implement a pipelined architecture for image rendering between at least one client and the server, wherein such architecture can hide latency for image rendering, transmission, and/or display stages. The pipelined architecture can also reduce the intervals between sequential responses from the server. Furthermore, the rendering pipe component can preprocess imagery and cache imagery on the server in order to accelerate the first-time image rendering Moreover, the subject innovation can include a transmission component that can utilize a communication protocol which maintains the rendering state on client side and enhances the rendering process on the server to be stateless and scalable. In order to efficiently handle requests from at least one client, the subject innovation can provide client-side request queuing, combination, and/or cancellation. Additionally, the pipe component can provide dynamic adjustment of a combine interval based at least in part upon network status. In other aspects of the claimed subject matter, methods are provided that facilitate utilizing multiple processing threads in order to render and compress imagery simultaneously.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
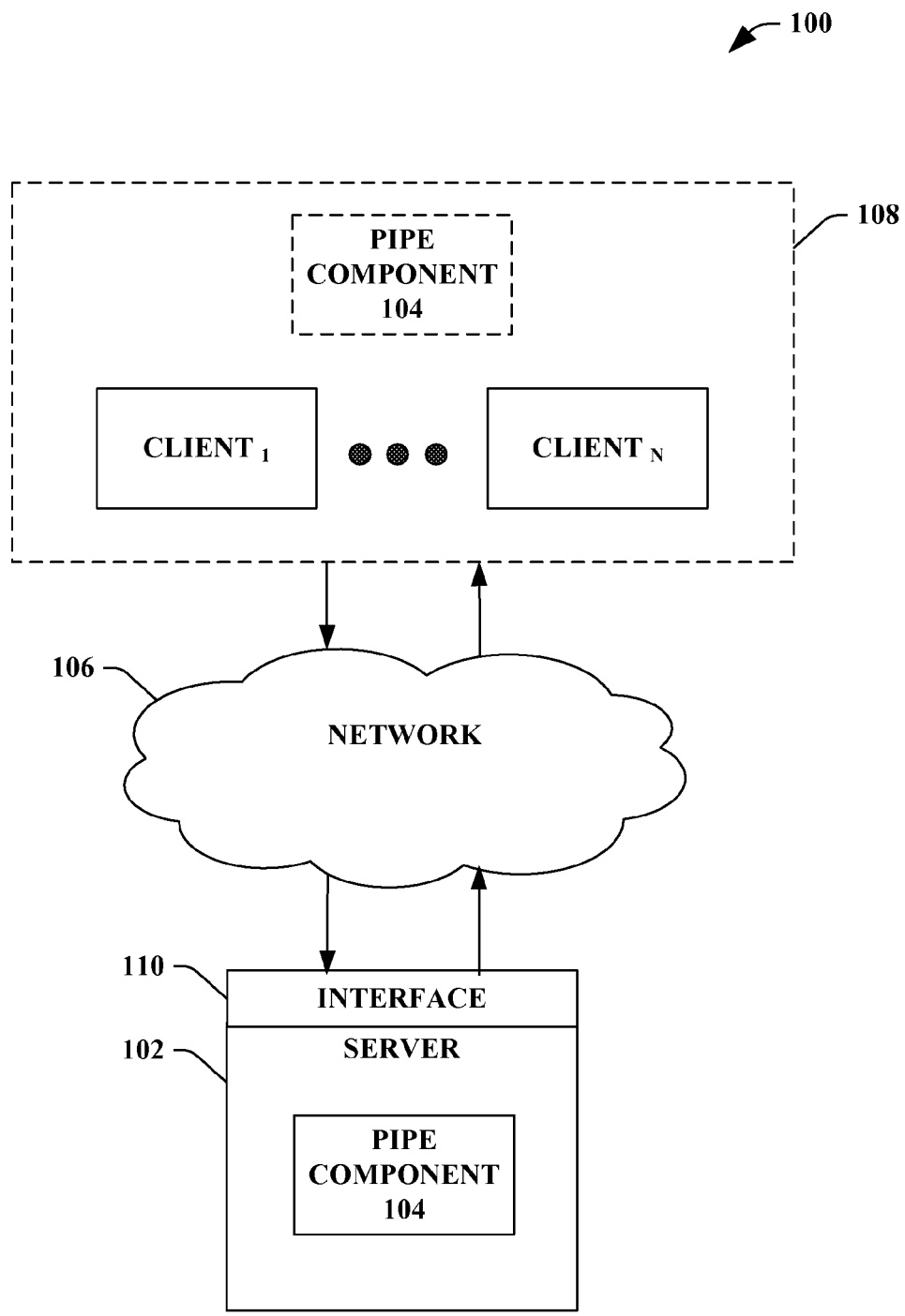
FIG. 1 illustrates a block diagram of an exemplary system that facilitates pipelining stages associated with a client accessing a portion of an image hosted by a server.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "engine," "network," "thread," "processor," "generator," "server," "tuner," "proxy," "cache," "queue," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates pipelining stages associated with a client accessing a portion of an image hosted by a server. The system 100 can include a client that can accept user manipulations in a pipe component 104 and send requests for the manipulations in another pipe component. The system 100 can include a server 102 that can host a portion of imagery, wherein a pipe component 104 can enforce a pipelined process for efficient rendering performance of such imagery. In general, the imagery on the server 102 can include any suitable imagery of any suitable format. For instance, the imagery can be 2-dimensional (2D) imagery, 3-dimensional (3D) imagery, medical imagery, virtual reality system imagery, video game imagery, imagery having a large file or data size, 3D medical image reconstruction, 3D medical image reconstruction in Picture Archiving and Communication System (PACS), etc. In particular, at least one client 108 can manipulate a portion of an image hosted by the server 102 via a network 106. For example, a client can provide a user request to manipulate a particular portion of an image in which the communication of the user request and/or the corresponding server response can be through the network 106. Moreover, it is to be appreciated that the pipe component 104 can reside on the server-side, the client-side, and/or any suitable combination thereof.

The pipe component 104 can employ a pipelined system for network transmission (e.g., communications related to at least one of the server 102, the pipe component 104 (server-side), pipe component 104 client-side, etc.), image rendering, transmission, and display in order to hide network latency and improve overall rendering performance. The system 100 can provide an adaptive mechanism for client request combination and/or cancellation. Moreover, the system 100 can implement a pipelined architecture for image rendering between at least one client 108 and the server 102, wherein such architecture can hide latency for image rendering, transmission, and/or display stages. The pipe components on both server-side and client-side 104 can further reduce intervals between sequential responses from the server 102. Furthermore, the rendering pipe component 104 can preprocess imagery and cache imagery on the server 102 in order to accelerate the first-time image rendering.

The system 100 can utilize a communication protocol that can enhance rendering requests and/or responses between at least one client 108 and the server 102. In order to efficiently handle requests from at least one client 108, the system 100 can provide client-side request queuing, combination, and/or cancellation. Additionally, the pipe component 104 can provide dynamic adjustment of a combine interval based at least in part upon network status. It is to be appreciated that the pipe component 104 can be a stand alone component, incorporated into the server 102 (as depicted), incorporated into the network 106, incorporated into at least one client 108, and/or any suitable combination thereof. Moreover, it is to be appreciated that there can be any suitable number of clients 108, such as $client_1$ to $client_N$, where N is a positive integer.

In addition, the system 100 can include any suitable and/or necessary interface component 110, which provides various adapters, connectors, channels, communication paths, etc. to integrate the pipe component 102 into virtually any operating and/or database system(s) and/or with one another. In addition, the interface component 110 can provide various adapters, connectors, channels, communication paths, etc., that provide for interaction with the server 102, the network 106, at least one client 108, and any other device and/or component associated with the system 100.

Figure 2:
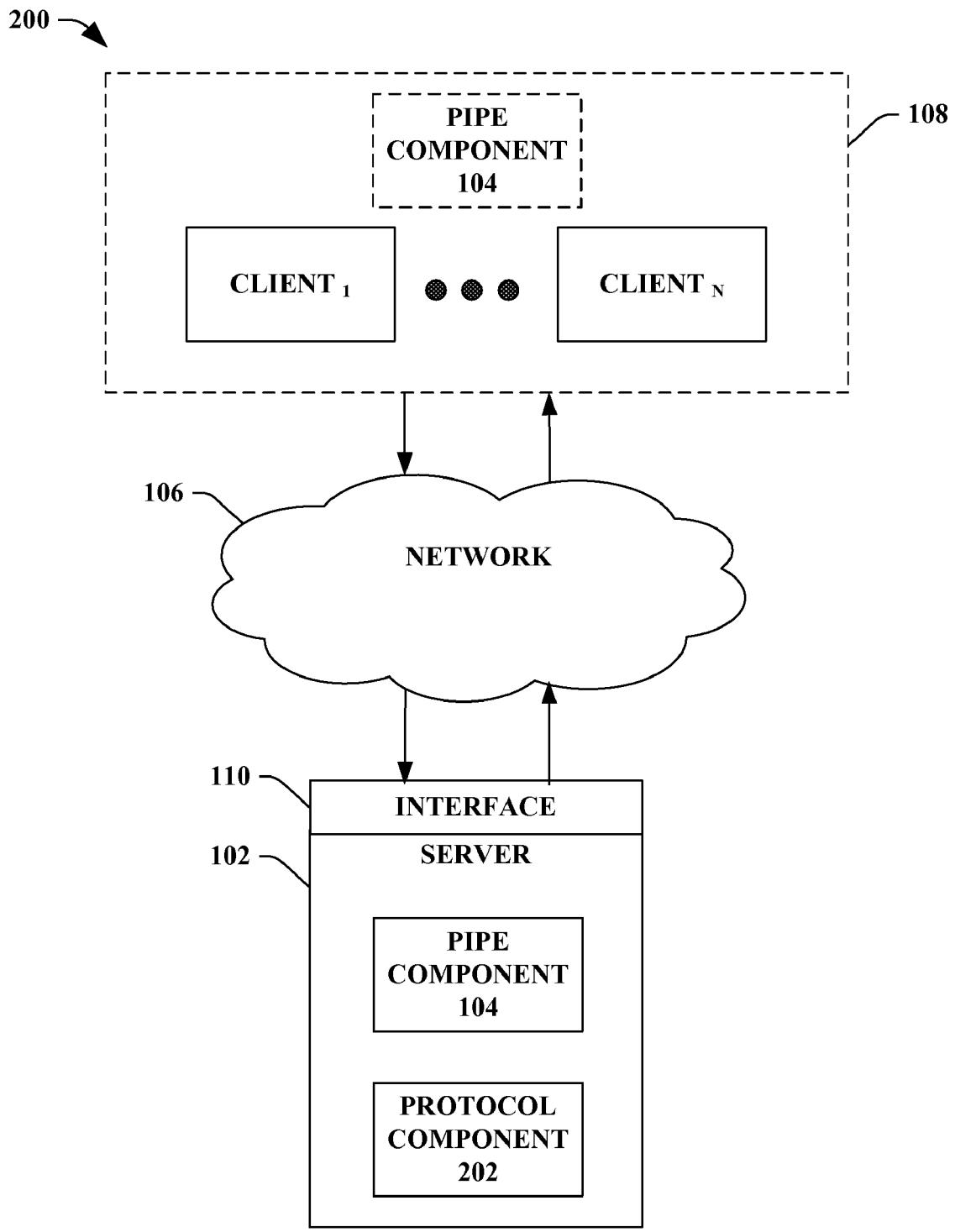
FIG. 2 illustrates a block diagram of an exemplary system that facilitates utilizing a communication protocol for asynchronous communication between a client and a server.

FIG. 2 illustrates a system 200 that facilitates utilizing a communication protocol for asynchronous communication between a client and a server. The system 200 can include the pipe component 104 that can employ a separate pipeline and processing thread for various stages (e.g., network transmission, user manipulation, request transmitting, rendering, compression, transmitting rendered image, decompression, displaying the image, etc.) of rendering a portion of imagery from the server 102. For instance, a user or client can utilize a device (e.g., a laptop, a desktop, a machine, a smartphone, a portable digital assistant (PDA), a gaming device, a web browser, a gaming device, a portable gaming device, a gaming console, a media player, a cellular device, etc.) to manipulate (e.g., rotate, zoom, pan, window/level, edit, crop, etc.) an image hosted by a server in which each stage between the client and the server can be isolated with respective processing threads for enhanced and improved performance, throughput, and scalability.

The pipe component 104 can isolate the rendering process between at least one client 108 and the server 104 (e.g., client and server are pipelined), etc. As discussed, the pipeline stages can include: network transmission, user manipulation, request transmitting, rendering, compression, transmitting rendered image, decompression, and displaying the image. Based at least in part upon the separation of the stages within pipelines and processing threads, the various stages can be processed simultaneously. For example, a rendering request can be communicated in an asynchronous manner (e.g., through multiple TCP/IP connections in a different thread than the user interface (UI) thread, etc.). Each pipeline stage can include a corresponding thread(s) to do processing and/or respective work. This pipelined architecture can hide the latency of each stage and shorten the interval between responses. Thus, manipulation speed can be increased and rendered images can be displayed more smoothly.

The pipelined process is designed for network-based server-side image rendering. On the client-side, clients and/or users can manipulate a rendered object or image. For instance, the manipulation can include rotation, zoom, pan, window/level, edit, and/or any other suitable interaction with a portion of an image. For such manipulations, a user and/or client can send a user request. These user requests can be sent through a "proxy." In the proxy, requests can be queued sequentially and sent out periodically. In one example, the sending interval can be adjusted by the response interval which can reflect a server's throughput. During this interval, similar requests can be combined to alleviate the network's workload. The proxy can also abandon a stale request in order to shorten the response time for user's manipulation.

Requests can be transmitted through the network 106. In one example, the request can be sent out by a web service (e.g., a web service based on REST (Representational State Transfer) protocol, etc.). It is to be appreciated that the request can be any other suitable communication protocol based on TCP/IP. Furthermore, for a pipelined transmission, the client can be able to establish multiple TCP/IP connections to the server 102. Thus in a network with high latency, the requests can be sent out continuously without any stall.

On receiving the render request, the server 102 can put the request into a render engine. Requests can be queued in the render engine. Each render engine can correspond to one graphics card (e.g., a graphics card associated with a device to interact with the portion of the image, etc.). To increase the response speed for first time rendering, images can be preprocessed into low resolution volume textures, which can be stored on disk in advance. Additionally, the full resolution textures can be cached in memory to shorten the rendering time for subsequent requests to the same image. Rendered images can be compressed in another thread than the rendering thread (e.g., a rendering thread, a compression thread, etc.). In other words, the separate threads for rendering and compressing the image can be handled simultaneously.

Compressed images can be sent out by the server 102. This can be done in a thread that receives a rendering request. Compressed images can be transmitted through the network 106, wherein multiple connections can be employed in order to parallelize transmissions, and shorten delay of the transmission pipeline stage. When the compressed image arrives at client 108, the image can be decompressed on the client-side. Images can be displayed in a UI thread on the client-side. In one example, an obsolete image (e.g., timestamps of which are older than the current timestamp) can be discarded in the UI thread on the client-side.

The system 200 can further include a protocol component 202 that can be utilized to communicate with the server 102. The protocol component 202 can get the image property by leveraging the image's identification (ID). The protocol component 202 can send rendering requests to the server 102 with this property in addition to information of the user's manipulation. This protocol can enable the asynchronous communication between at least one client 108 and the server 102. The protocol component 202 can also transmit information of manipulation mode and rendering quality to support request combination and cancellation.

The requests can be sent through "WebGet" method of HTTP protocol (HyperText Transfer Protocol) to avoid separated transmission for header and body, and reduce the redundant round trip communication. For example, the request for getting image property can be defined with the following pseudo-code:

```
[WebGet]
Dicom3DProperty GetDicom3DProperty(Guid imageID);
The Dicom3DProperty is defined as:
public struct Dicom3DProperty
{
    public float RealWidth;
    public float RealHeight;
    public float RealDepth;
    public WindowLevel DefaultWinLev;
    public int MaxWindowWidth;
}
public struct WindowLevel
{
    [DataMember]
    public float Width;
    [DataMember]
    public float Center;
}
```

The above can include the dimension of the object (RealWidth, RealHeight, RealDepth), default window/level value (DefaultWinLev) stored (e.g., in the DICOM (Digital Imaging and Communications in Medicine) files, which also contain the 3D images, etc.), and the maximum value of window/level (MaxWindowWidth). The latter two variables can be used to do window/level operation for images.

The rendering requests can be sent through asynchronous web service call supported by, for instance, WCF (Windows Communication Foundation). Rendering requests are defined with the following pseudo-code:

```
[WebGet]
Stream RenderDicom3DImage(Guid imageID, string param);
[OperationContract(AsyncPattern = true)]
IAsyncResult BeginRenderDicom3DImage(Guid imageID, string param,
AsyncCallback callback, object asyncState);
Stream EndRenderDicom3DImage(IAsyncResult result);
```

Since "WebGet" can be also used to improve the performance, parameters containing the manipulation information can be serialized to a string parameter, which named as "param" in the above function declaration. The type of this parameter can be defined with the following pseudo-code:

```
public struct SceneParams
{
    //size of the frame to display image
    public int SceneWidth;
    public int SceneHeight;
    //define the W/L parameters
    public WindowLevel WinLev;
    //define transform matrices
    public TransformMatrix WorldMatrix;
    public TransformMatrix ViewMatrix;
    public TransformMatrix ProjectionMatrix;
    public ManipulationState ManiState;
    public RenderingAlgorithm Algorithm;
    public RenderingEffect Effect;
    public RenderingQuality Quality;
    public RenderingShade Shade;
}
public enum ManipulationState
{
    None,
```

```
    Pan,
    Zoom,
    Rotate,
    WindowLevel,
}
```

The above structure can include the following information: rendering dimension on client-side (SceneWidth, SceneHeight); current window/level value; matrices representing the transformation of world, view and projection; manipulation mode (rotate, zoom, pan and window/level); rendering algorithm and quality, etc.

Figure 3:
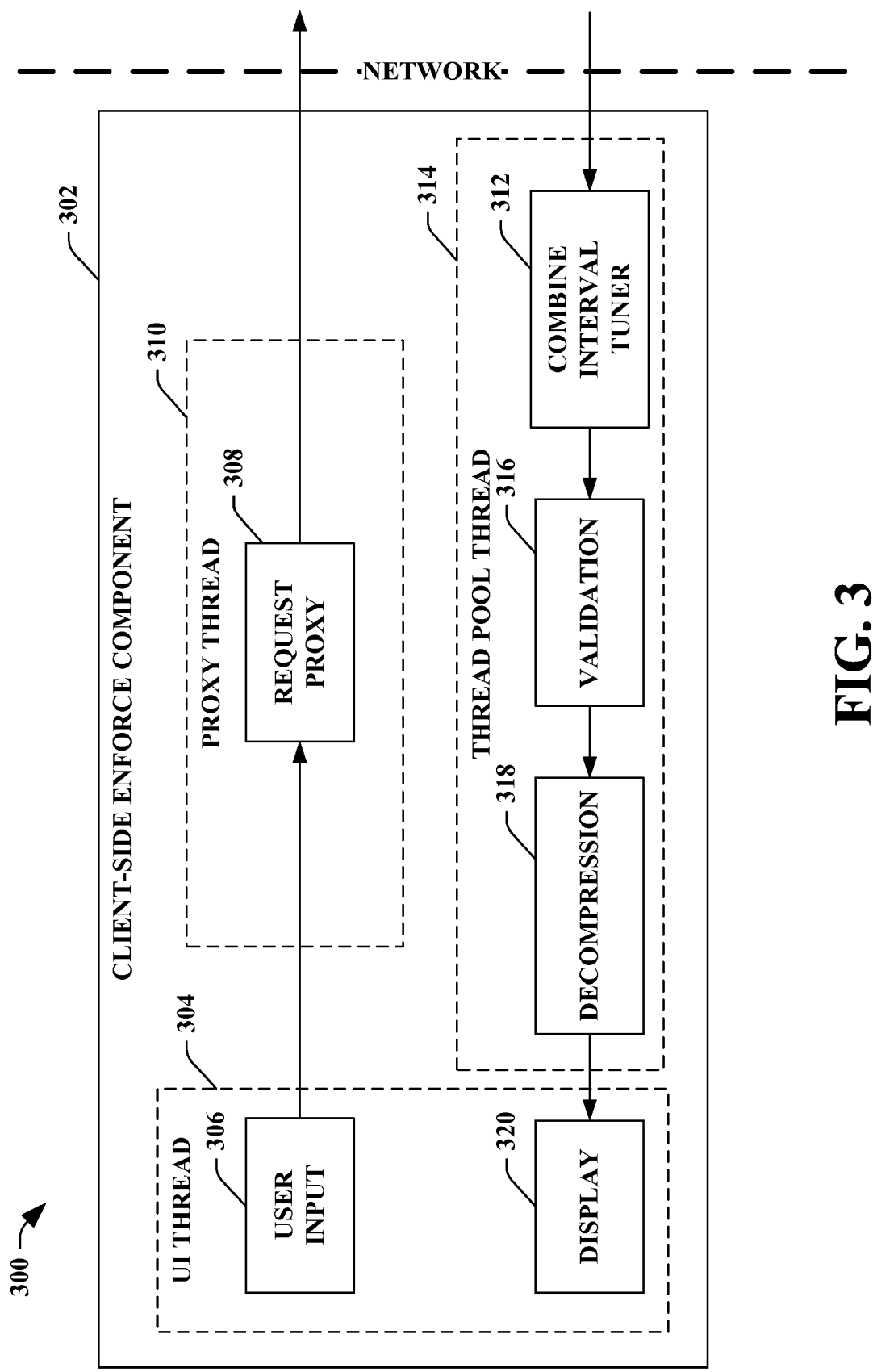
FIG. 3 illustrates a block diagram of an exemplary system that facilitates rendering a request on a client-side in connection with image rendering.

FIG. 3 illustrates a system 300 that facilitates rendering a request on a client-side in connection with image rendering. The system 300 can include a client-side enforce component 302 that can manage rendering requests between at least one client and a server via a network. When a user and/or a client manipulates an image (e.g., 3D image, 3D medical image, etc.) on a client-side, a new rendering request can be generated based on the manipulation. The rendering request can include the following information: (1) A timestamp at which this request is generated; (2) Matrices representing the transformation that can be done on the image; (3) Rendering algorithm and quality (e.g., low, standard, etc.); and (4) Manipulation mode (e.g., rotate, zoom, pan, etc.).

Request generation can be done in a UI thread 304. Rendering quality can be determined by a user's action (e.g., user input 306). For instance, if the user's action can produce an intermediate/temporary view of the image, request for image with low quality can be generated. If the user's action indicates the end of a manipulation, a request for a standard quality image can be generated. For example, in a rotate mode, a user can drag the object with an input device (e.g., a mouse, touch screen, etc.) to rotate the object/image. When the user is dragging the object/image, a low quality request can be communicated (e.g., sent out). After the user stops dragging, (e.g., indicated by a mouse-up event, etc.) a request for image with standard quality can be sent to the server.

The requests can be sent to a request proxy 308 within a proxy thread 310. The proxy 308 can be in two states: "idle" or "processing." If there is no request in the queue of proxy, the proxy can be in the idle state; otherwise, the proxy can be in the processing state. If the proxy is in the idle state, a new request can be queued directly. If the proxy is in the processing state, request can be combined to the last request waiting in the queue if the following requirements are met: (1) The new request is generated within a "combine interval" after the last request, that is $\text{TimeStamp}_{Request} - \text{TimeStamp}_{LastRequest} < \text{CombineInterval}$; (2) The new request's manipulation mode is same as the last one; and (3) The new request's rendering algorithm and quality is the same as the last one.

In the processing state, the proxy 308 can send out the first request in the request queue every "combine interval." The combine interval can determine whether two requests can be combined. It can also specify the interval between sending two consecutive requests. The combine interval can be adjusted by the response status (e.g., discussed in more detail below). If user's input indicates an end of the manipulation (such as the mouse up event after a drag), the request proxy 308 can cancel all the pending requests in the request queue and send the new request out. The request proxy 308 can work in the proxy thread 310.

When the client receives a rendered image from the server, the response time can be used to tune the combine interval via the combine interval tuner 312 (within a thread pool thread 314). The client can validate the response (e.g., validation 316) based at least in part upon the timestamp of the image. If the timestamp of the request corresponding to this response is later than the "current timestamp," the response is deemed valid and the images contained in this response can be decompressed (e.g., decompression 318) and displayed (e.g., display 320) on client. The current timestamp can be set to the timestamp of the corresponding request. Otherwise, the response can be discarded. The tuning of combine interval, validation and decompression can be executed in the thread pool thread 314, which can be created by the asynchronous call of a web service. Display can be done in the UI thread 304.

Figure 4:
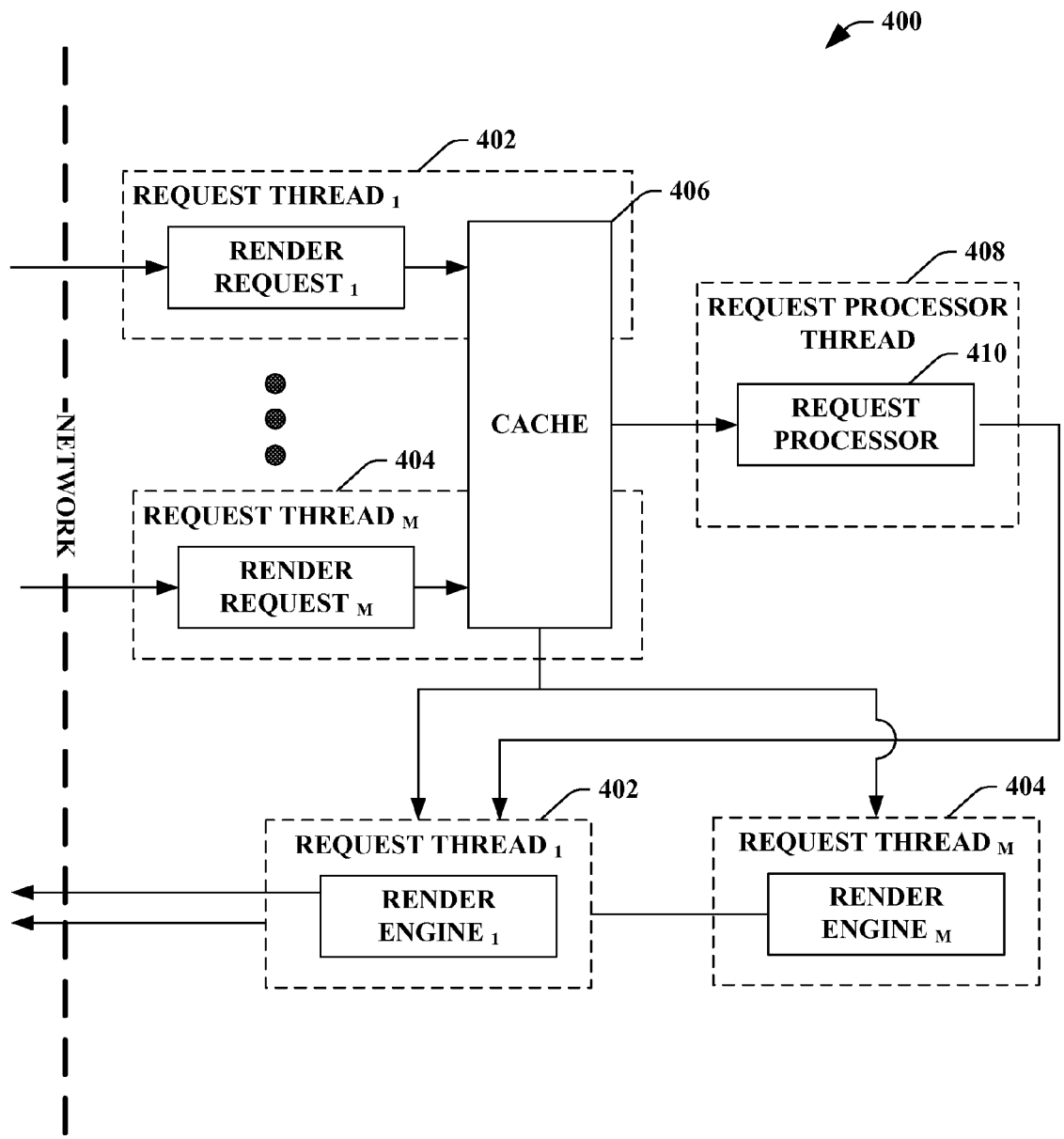
FIG. 4 illustrates a block diagram of an exemplary system that facilitates rendering a request on a server-side with separate threads for each render engine.

FIG. 4 illustrates a system 400 that facilitates rendering a request on a server-side with separate threads for each render engine. The system 400 can enable each rendering request to be received in a separate processing thread (e.g., depicted by request thread$_1$ 402 to request thread$_M$ 404, where M is a positive integer). In particular, on the server-side, each rendering request can be received in a separate thread. With each rendering request being received in a separate thread, transmissions for different requests can be executed in parallel. The request can check a cache 406 to determine whether the image requested has been loaded. If the image has been loaded, the rendering request can be sent to a render engine to process.

Each render engine can run in a separate thread. For instance, a DirectX device can be used in the thread which created it. If rendering is done by a graphics processing unit (GPU), the number of engine threads can be equal to the number of GPUs. If software rendering is adopted, the number of engine threads can be determined by the number of central processing unit (CPU) cores. If the image requested does not exist in the cache 406, the request can be queued into a request processor 410 within a request processor thread 408. The request processor 410 can process each request sequentially. It first loads the image requested and inserts it into the cache, then the request is removed from the queue in the request processor 410 and queued in a render engine.

Figure 5:
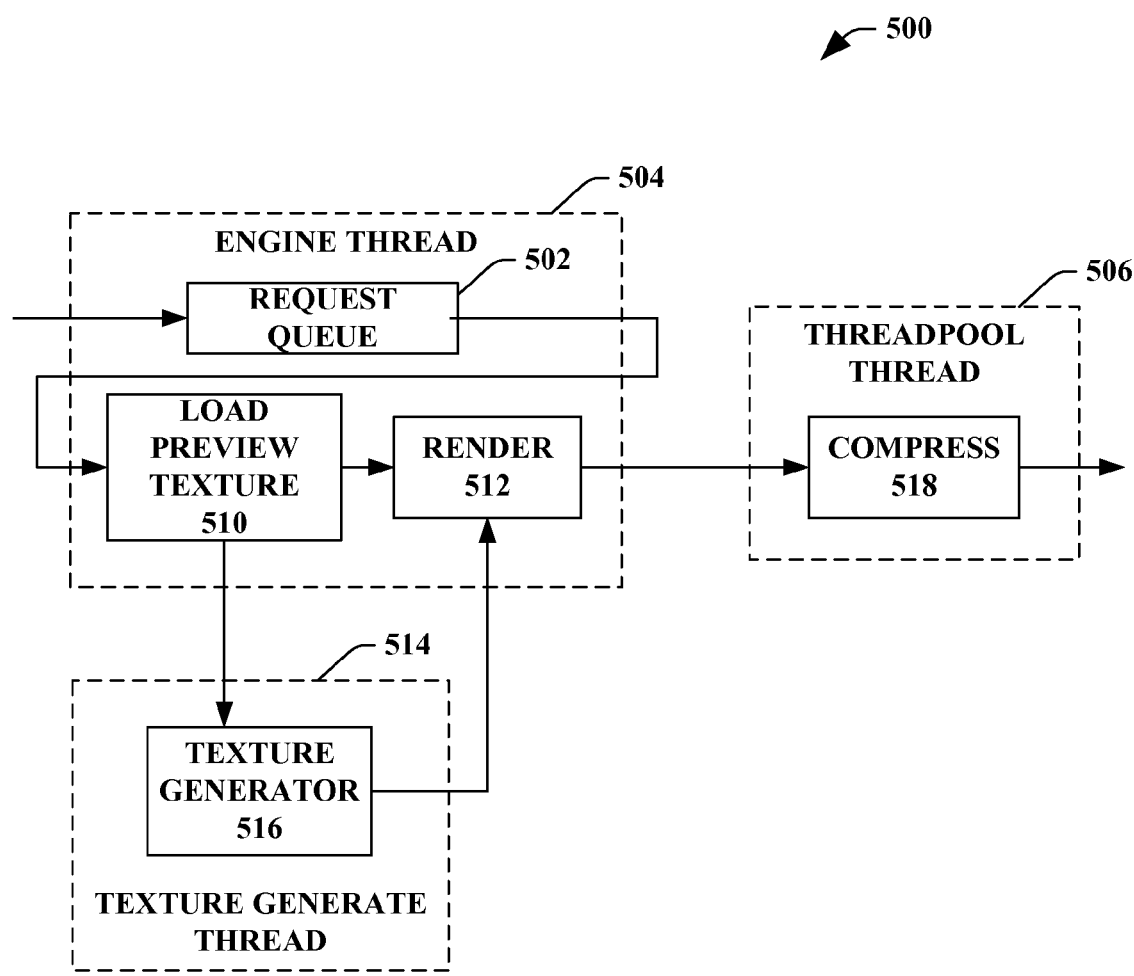
FIG. 5 illustrates a block diagram of exemplary system that facilitates utilizing multiple processing threads in order to render and compress imagery simultaneously.

FIG. 5 illustrates a system 500 that facilitates utilizing multiple processing threads in order to render and compress imagery simultaneously. The system 500 can provide a rendering process of a render engine in accordance with the subject innovation. The system 500 can include an engine thread 504, a thread pool thread 506, and/or a texture generate thread.

A render engine can receive a request from a request queue 502. If the full resolution texture has not been generated, the render engine can first load the preview texture from the disk and use it to do the rendering (e.g., load preview texture 510 and/or render 512). For example, the preview textures can be pre-created from the DICOM files with scaled low resolution (e.g., enabling to fit in limited dimensions with a short load time, etc.). The render engine can also start a thread to compute and generate the data for full resolution texture (e.g., the texture generator 516, the texture generate thread 514). When this texture is generated, subsequent requests can be rendered using it. After the image has been rendered, the image can be compressed (e.g., compress 518) in a thread from the thread pool thread 506, so that the compression and rendering can be performed simultaneously.

Figure 6:
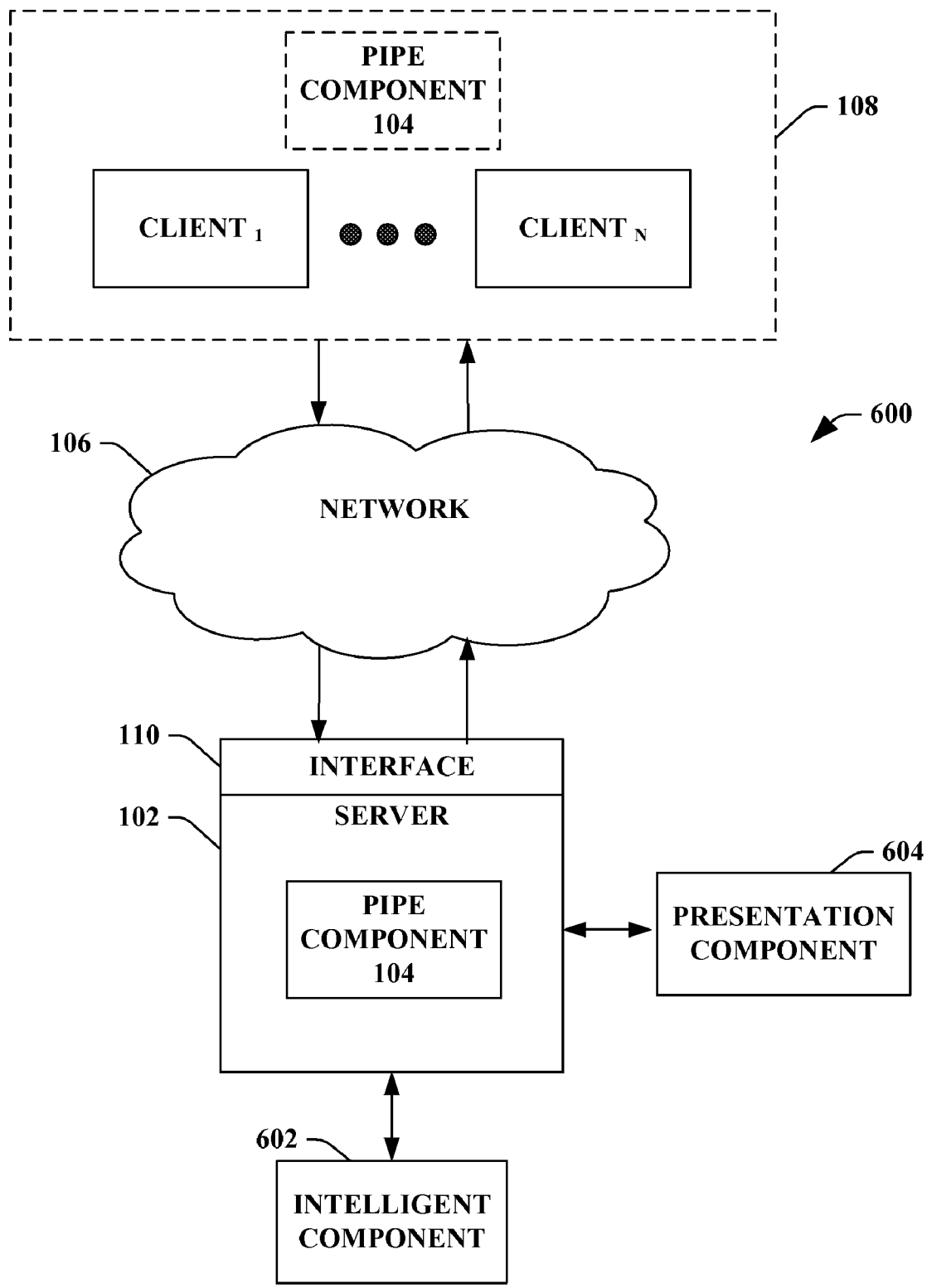
FIG. 6 illustrates a block diagram of an exemplary system that facilitates automatically reducing latency associated with client and server communications in connection with interaction with a portion of an image.

FIG. 6 illustrates a system 600 that employs intelligence to facilitate automatically reducing latency associated with client and server communications in connection with interaction with a portion of an image. The system 600 can include the server 102, the pipe component 104, the network 106, at least one client 108, and the interface 110 which can be substantially similar to respective servers, components, networks, clients, and interfaces described in previous figures. The system 600 further includes an intelligent component 602. The intelligent component 602 can be utilized by the pipe component 102 to facilitate executing processing threads for requests and responses between a client and a server in connection with accessing image data. For example, the intelligent component 602 can infer pipelining settings, processing thread configurations, combine interval adjustments, proxy settings, client-side request queue management, client-side request combination, client-side request cancellation, communication protocol settings, preprocessing of imagery, cache configurations, selection between resolution of images, detection of user actions, server-side rendering information, etc.

The intelligent component 602 can employ value of information (VOI) computation in order to manage responses and requests between a client and a server. For instance, by utilizing VOI computation, the most ideal and/or appropriate client requests can be identified in order to combine, queue, or cancel such requests appropriately. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The pipe component 104 can further utilize a presentation component 604 that provides various types of user interfaces to facilitate interaction between a user and any component coupled to the pipe component 104. As depicted, the presentation component 604 is a separate entity that can be utilized with the pipe component 104. However, it is to be appreciated that the presentation component 604 and/or similar view components can be incorporated into the pipe component 104 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the pipe component 104.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
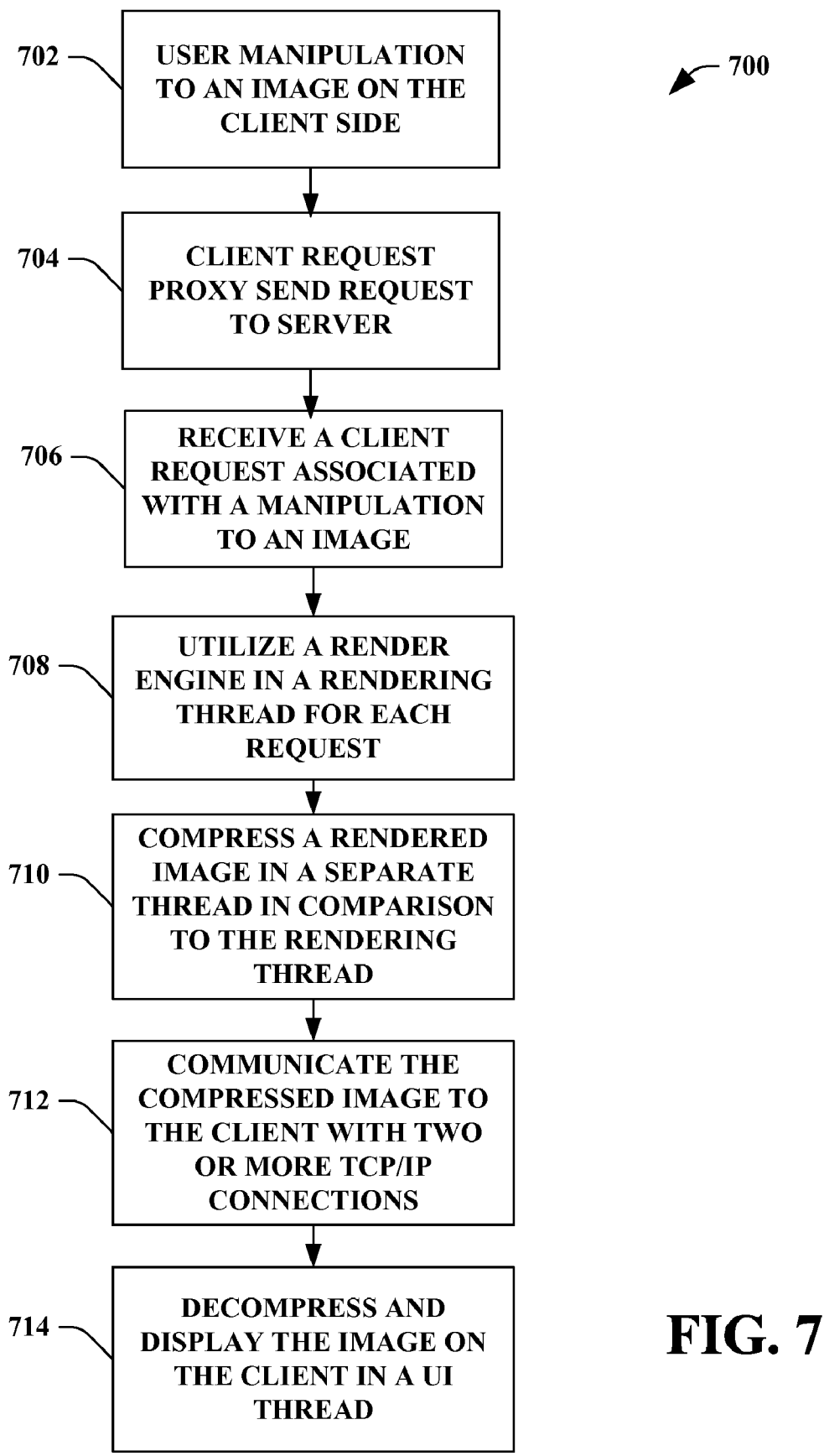
FIG. 7 illustrates an exemplary methodology for pipelining stages associated with a client accessing a portion of an image hosted by a server.
Figure 8:
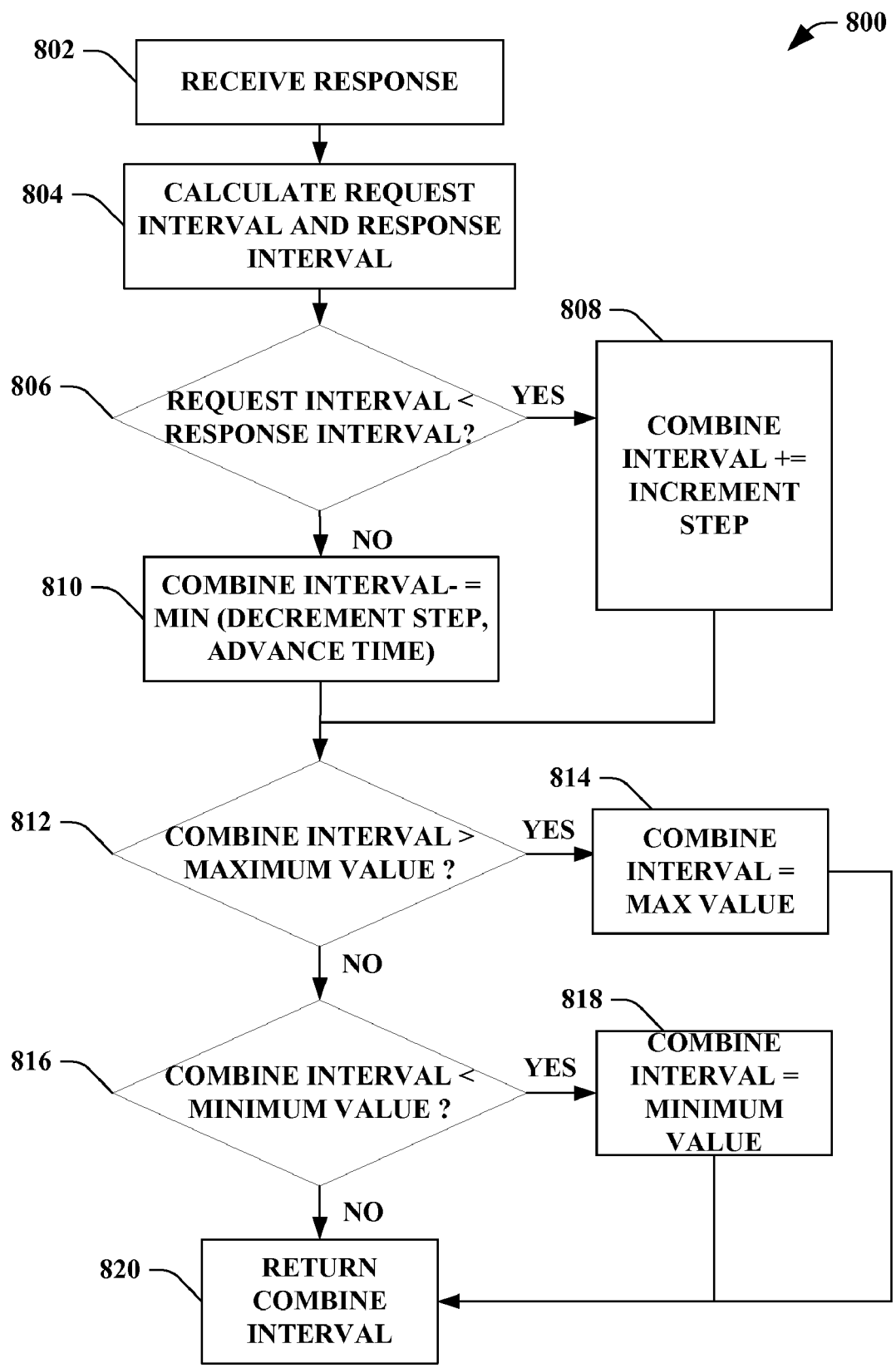
FIG. 8 illustrates an exemplary methodology that facilitates dynamically adjusting a combine interval between two or more requests from a client.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates pipelining stages associated with a client accessing a portion of an image hosted by a server. At reference numeral 702, a user can manipulate an image on the client side. At reference numeral 704, a client can request proxy to send request to a server. At reference numeral 706, a client request associated with a manipulation to an image can be received, wherein the client request is communicated through a proxy. The proxy can queue two or more requests in which the communication of such requests can be managed based at least in part upon a network load.

At reference numeral 708, a render engine in a rendering thread can be dedicated and utilized for each client request. In particular, each client request targeted for an image on a server can be implemented with a respective processing thread. Moreover, each render engine can correlate to one graphics card. At reference numeral 710, a rendered image can be compressed in a separate thread in comparison to the rendering thread. In other words, the rendering and the compressing of the image can be implemented simultaneously.

At reference numeral 712, the compressed image can be communicated to the client with two or more TCP/IP connections in order to maintain continuous communication of responses (e.g., as well as continuous communications of requests). At reference numeral 714, the image can be decompressed and displayed on the client in a user interface (UI) thread. It is to be appreciated that the above methodology 700 maintains stages of image rendering, image transmission, and image display within separate and distinct processing threads and/or pipelines.

FIG. 8 illustrates a method 800 for dynamically adjusting a combine interval between two or more responses from a client. In general, when a client receives a response, it will record the receiving time and corresponding request send time. The methodology 800 can examine the timings of such correspondence in order to dynamically adjust the combine interval. If the interval between last two responses is longer than that between the corresponding two requests, the combine interval is increased by "incremental step." This situation can generally imply that the server cannot handle the requests instantly—thus fewer requests should be sent to alleviate the workload of server.

If the interval between last two responses is shorter than or equal to that between the corresponding two requests, the combine interval can be decreased by the minimum value of advance time and "decrement step." The advance time can be calculated by subtracting the response interval from the request interval. Here the combine interval can be decreased conservatively, so that the workload of the server may not be increased dramatically and the throughput of server can reach a steady state.

The adjusted combine interval can be further adjusted to be in the range of a minimum value and maximum value. Here the minimum combine interval equals to the longest processing time among all the pipeline stages. The maximum combine interval equals to the total processing time of the entire pipeline.

At reference numeral 802, a response is received. The response can include a request time and a response time. At reference numeral 804, the request interval and response interval can be calculated. At reference numeral 806, a determination is made whether the request interval is less than the response interval. If the request interval is less than the response interval (YES), the methodology 800 continues to reference numeral 808. At reference numeral 808, the combine interval can be increased by the "increment step". If the request interval is not less than the response time (NO), the methodology 800 continues to reference numeral 810. At reference numeral 810, the combine interval can be decreased by the Min(decrement step, advance time).

At reference numeral 812, a determination is made whether the combine interval is greater than a maximum value. If the combine interval is greater than a maximum value (YES), the methodology 800 continues to reference numeral 814, where the combine interval can be set to maximum value. If the combine interval is not greater than a maximum value (NO), the methodology 800 can continue to reference numeral 816.

At reference numeral 816, a determination is made whether the combine interval is less than a minimum value. If the combine interval is less than the minimum value (YES), the methodology 800 can continue to reference numeral 818 in which the combine interval is set to a minimum value. If the combine interval is not less than the minimum value (NO), the methodology can continue to reference numeral 820. At reference numeral 820, the combine interval can be returned.

Figure 9:
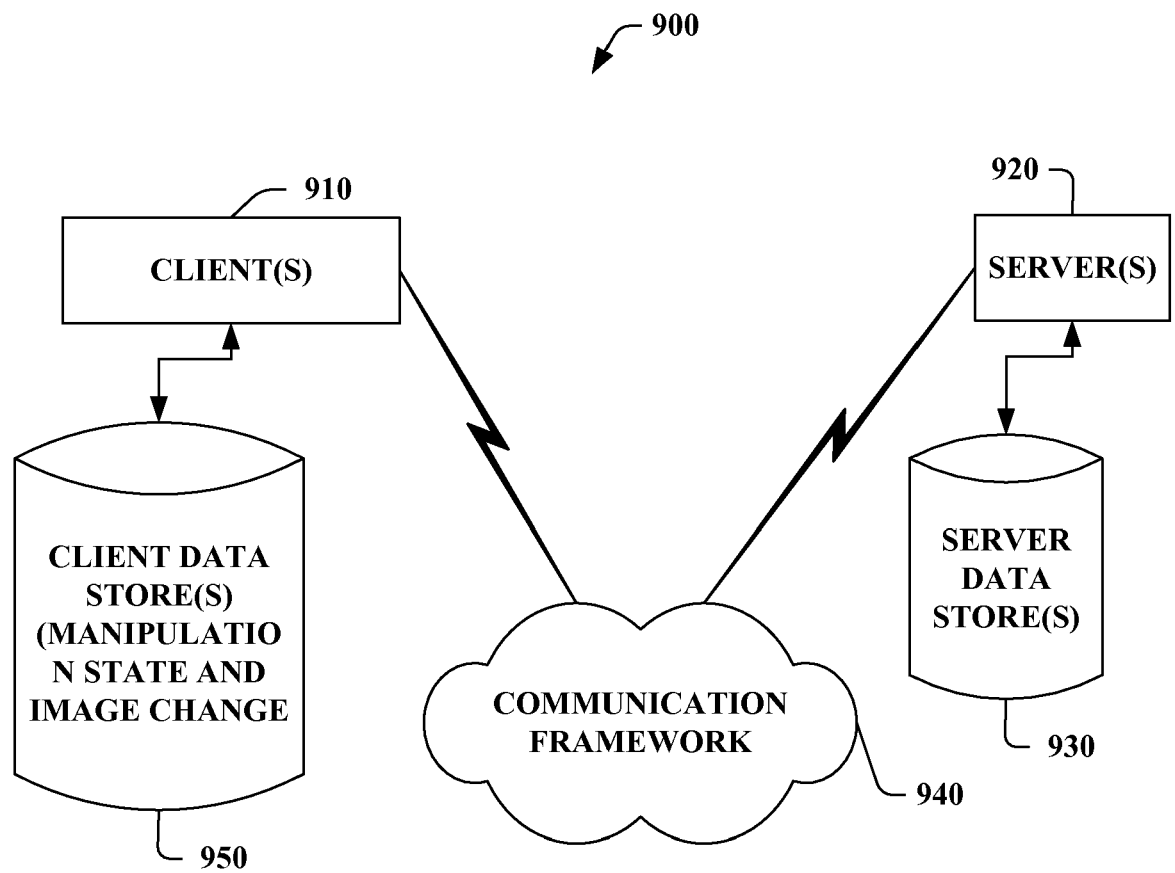
FIG. 9 illustrates an exemplary networking environment, wherein the novel aspects of the claimed subject matter can be employed.
Figure 10:
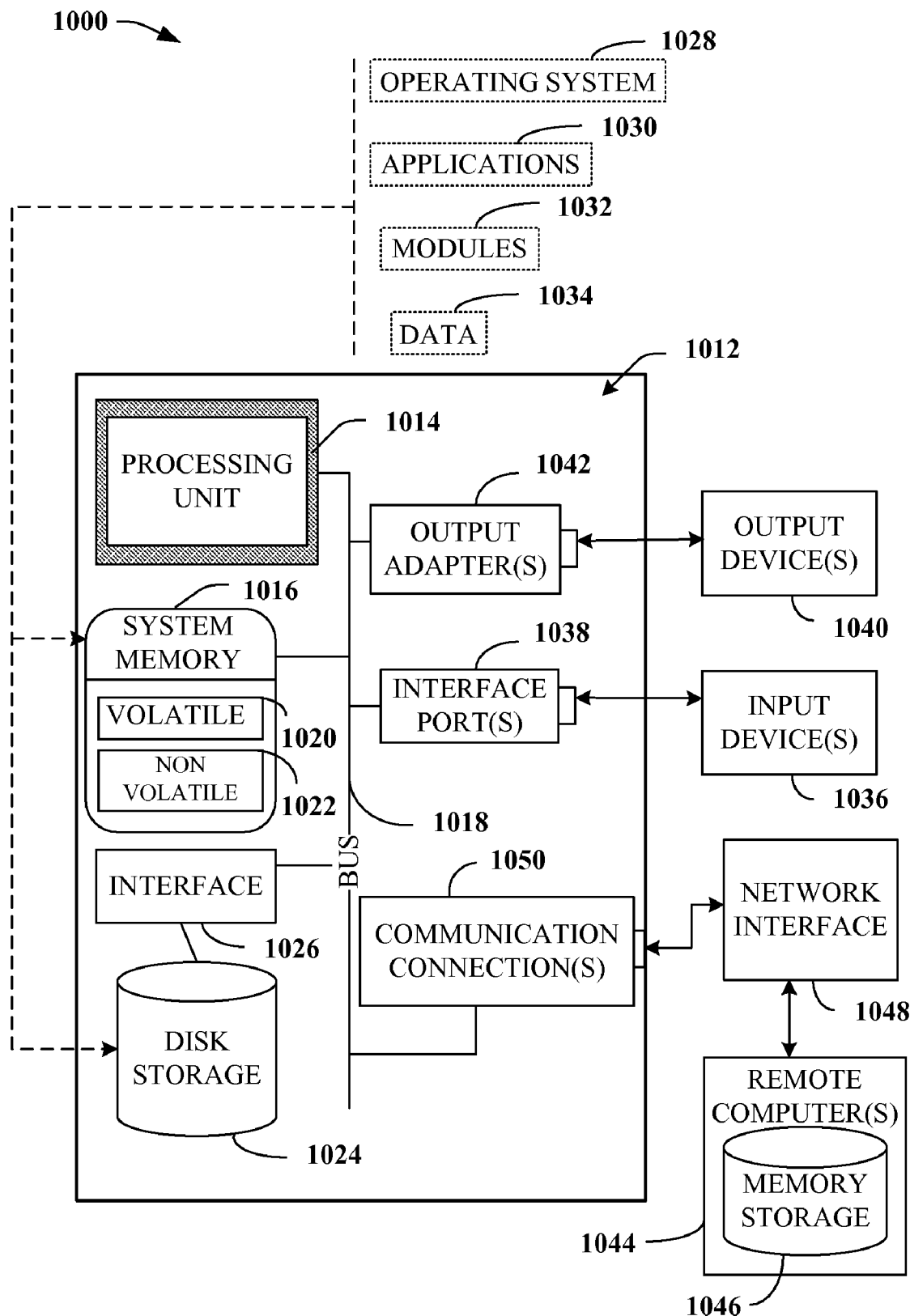
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a pipe component that utilizes a separate pipeline and processing thread for various stages associated with manipulating an image hosted by a server, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. It is to be appreciated that the client data store(s) 950 can maintain at least one of a manipulation state and/or current transformation to an image. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system, comprising:
   a processor configured to execute computer-executable components; and
   memory storing computer-executable components including:
   a client configured to asynchronously communicate with a server for interacting with image data hosted by the server; and
   a pipe component configured to, in separate threads corresponding to respective pipeline stages, process an interaction with the image data, process a transmission of requests corresponding to the interaction, process image data received in responses from the server, and process a display of image data;
   wherein the requests corresponding to the interaction are queued sequentially and communicated to the server periodically based on a combine interval that specifies an interval between sending consecutive requests, each request includes information representing a manipulation mode and a rendering quality, queued requests are combined if the queued requests are generated within the combine interval and if the queued requests have the same manipulation mode and the same rendering quality, and the combine interval is adjusted by:
   calculating a request interval between consecutive requests and a response interval between responses to the consecutive requests,
   increasing the combine interval with an increment step if the request interval is less than the response interval,
   decreasing the combine interval with a minimum of a decrement step and a difference between the request interval and the response interval if the request interval is not less than the response interval,
   setting the combine interval to a maximum value if the combine interval is greater than a maximum value, and
   setting the combine interval to a minimum value if the combine interval is less than the minimum value.

2. The system of claim 1, wherein the interaction with the image data includes at least one of a rotation, a zoom, a pan, a window/level, or an edit.

3. The system of claim 1, wherein the image data includes at least one of 2-dimensional (2D) image data, 3-dimensional (3D) image data, medical image data, virtual reality system image data, video game image data, 3D medical image reconstruction data, or 3D medical image Multi-Plane Reconstruction in Picture Archiving and Communication System (PACS) data.

4. The system of claim 1, wherein each request further includes at least one of: a timestamp and information representing a transformation that can be performed on the image data.

5. The system of claim 1, wherein the server employs a plurality of render engines for the consecutive requests.

6. The system of claim 1, wherein the pipe component is configured to process at least two of the respective pipeline stages substantially simultaneously.

7. The system of claim 1, wherein the server is configured to preprocess at least a portion of the image data into a low resolution volume texture and store the low resolution volume texture on a data store.

8. The system of claim 1, wherein the server is configured to render at least a portion of the image data in a first thread and compress the rendered portion of the image data in a second thread, substantially simultaneously.

9. The system of claim 1, further comprising a request proxy configured to queue the requests.

10. The system of claim 1, wherein the computer-executable components further include a protocol component configured to utilize a protocol to communicate with the server by receiving an image property by an image identification (ID) and rendering requests to the server with the image property and information corresponding to a manipulation.

11. The system of claim 1, wherein the pipe component is configured to support cancellation of queued requests in response to a new request corresponding to user input indicating an end of manipulation of the image data.

12. The system of claim 1, wherein the requests are sent through an asynchronous web service call to the server.

13. The system of claim 1, wherein the consecutive requests have the same manipulation mode and different rendering qualities.

14. The system of claim 1, wherein the consecutive requests have the same rendering quality and different manipulation modes.

15. A computer-readable storage device storing instructions that, when executed by a computing device, cause the computing device to perform a method comprising:
asynchronously communicating with a server for interacting with image data hosted by the server; and
processing in separate threads corresponding to respective pipeline stages: an interaction with the image data, a transmission of requests corresponding to the interaction, image data received in responses from the server, and a display of image data;
wherein the requests corresponding to the interaction are queued sequentially and communicated to the server periodically based on a combine interval that specifies an interval between sending consecutive requests, each request includes information representing a manipulation mode and a rendering quality, queued requests are combined if the queued requests are generated within the combine interval and if the queued requests have the same manipulation mode and the same rendering quality, and the combine interval is adjusted by:
calculating a request interval between consecutive requests and a response interval between responses to the consecutive requests,
increasing the combine interval with an increment step if the request interval is less than the response interval,
decreasing the combine interval with a minimum of a decrement step and a difference between the request interval and the response interval if the request interval is not less than the response interval,
setting the combine interval to a maximum value if the combine interval is greater than a maximum value, and
setting the combine interval to a minimum value if the combine interval is less than the minimum value.

16. The computer-readable storage device of claim 15, the method further comprising:
canceling queued requests in response to a new request corresponding to user input indicating an end of manipulation of the image data; and
transmitting the new quest to the server.

17. The computer-readable storage device of claim 15, wherein:
the image data includes at least one of: 2-dimensional (2D) image data, 3-dimensional (3D) image data, medical image data, virtual reality system image data, video game image data, 3D medical image reconstruction data, or 3D medical image Multi-Plane Reconstruction in Picture Archiving and Communication System (PACS) data; and
the interaction with the image data includes at least one of: a rotation, a zoom, a pan, a window/level, or an edit.

18. A computer-implemented method comprising:
asynchronously communicating with a server for interacting with image data hosted by the server; and
processing in separate threads corresponding to respective pipeline stages: an interaction with the image data, a transmission of requests corresponding to the interaction, image data received in responses from the server, and a display of image data;
wherein the requests corresponding to the interaction are queued sequentially and communicated to the server periodically based on a combine interval that specifies an interval between sending consecutive requests, each request includes information representing a manipulation mode and a rendering quality, queued requests are combined if the queued requests are generated within the combine interval and if the queued requests have the same manipulation mode and the same rendering quality, and the combine interval is adjusted by:
calculating a request interval between consecutive requests and a response interval between responses to the consecutive requests,
increasing the combine interval with an increment step if the request interval is less than the response interval,
decreasing the combine interval with a minimum of a decrement step and a difference between the request interval and the response interval if the request interval is not less than the response interval,
setting the combine interval to a maximum value if the combine interval is greater than a maximum value, and
setting the combine interval to a minimum value if the combine interval is less than the minimum value.

19. The method of claim 18, further comprising:
canceling queued requests in response to a new request corresponding to user input indicating an end of manipulation of the image data; and
transmitting the new quest to the server.

20. The method of claim 18, wherein:
the image data includes at least one of: 2-dimensional (2D) image data, 3-dimensional (3D) image data, medical image data, virtual reality system image data, video game image data, 3D medical image reconstruction data, or 3D medical image Multi-Plane Reconstruction in Picture Archiving and Communication System (PACS) data; and
the interaction with the image data includes at least one of: a rotation, a zoom, a pan, a window/level, or an edit.

* * * * *